(12) United States Patent  
Meyer (10) Patent No.: US 6,381,851 B1  
(45) Date of Patent: May 7, 2002

(54) COMBINATION CUTTER AND SERVER

(75) Inventor: Debbie Jean Meyer, Newtown, CT (US)

(73) Assignee: Housewares America, Inc., New York, NY (US)

( * ) Notice: Subject to any disclaimer, the term of this patent is extended or adjusted under 35 U.S.C. 154(b) by 0 days.

(21) Appl. No.: 09/639,200

(22) Filed: Aug. 15, 2000

(51) Int. Cl.[7] ............................................. A21C 15/04
(52) U.S. Cl. .......................... 30/114; 30/304; 30/312; 294/99.2; D7/673
(58) Field of Search ........................ 30/114, 115, 117, 30/124, 304, 312; D7/673, 669, 693; 294/99.2

(56) References Cited

U.S. PATENT DOCUMENTS

| | | | |
|---|---|---|---|
| 1,104,718 A | | 7/1914 | Trevisan .................. 30/114 |
| 2,264,486 A | | 12/1941 | Smith et al. ............. 30/114 |
| 2,403,190 A | | 7/1946 | Parraga .................. 30/303 |
| D159,729 S | | 8/1950 | Harvey ................... D7/693 |
| 2,600,646 A | | 6/1952 | Haugland ................ 30/114 |
| 2,770,035 A | | 11/1956 | O'Brien ................. 30/114 |
| 2,841,868 A | | 7/1958 | O'Brien ................. 30/114 |
| 3,045,347 A | | 7/1962 | Elias et al. ............ 30/303 |
| D248,271 S | | 6/1978 | McGee, III .............. D7/694 |
| 4,592,139 A | * | 6/1986 | Huang ................... 30/114 |
| 4,625,403 A | * | 12/1986 | Jansson et al. .......... 30/114 |
| 4,637,138 A | | 1/1987 | Piché .................... 30/114 |
| 4,847,998 A | * | 7/1989 | Colozzi et al. .......... 30/114 |
| 5,129,159 A | | 7/1992 | Fuenzalia ............... 30/114 |
| D363,860 S | | 11/1995 | Gallo ................... D7/673 |
| D381,244 S | | 7/1997 | Laib .................... D7/673 |
| D400,064 S | | 10/1998 | Tellez .................. D7/669 |
| D413,050 S | * | 8/1999 | Meyer ................... D7/673 |
| D427,024 S | * | 6/2000 | Meyer ................... D7/673 |
| D446,427 S | * | 8/2001 | Meyer ................... D7/673 |

* cited by examiner

*Primary Examiner*—Hwei-Siu Payer  
(74) *Attorney, Agent, or Firm*—Frishauf, Holtz, Goodman, Langer & Chick, P.C.

(57) ABSTRACT

A combination cutter and server includes a first thin flexible blade having front and rear opposite ends; a second thin flexible blade having front and rear opposite ends; a connecting section which connects together the front end of the first thin blade and the front end of the second thin blade; a first handle connected to the rear end of the first thin blade; and a second handle connected to the rear end of the second thin blade and being unconnected with the first handle, the first handle being coplanar with the first thin blade in an unbiased condition of the combination cutter and server, and the second handle being coplanar with the second thin blade in an unbiased condition of the combination cutter and server; only rear ends of the first and second handles being in contact with other to form the combination cutter and server into a first geometric cutting configuration when the first and second handles are initially moved toward each other to an initial biased position; and the first and second handles being in contact with other along substantially entire lengths thereof to form the combination cutter and server into a second, different geometric cutting configuration when the first and second handles are further moved toward each other from the initial biased position.

11 Claims, 6 Drawing Sheets

COMBINATION CUTTER AND SERVER

BACKGROUND OF THE INVENTION

1. Field of the Invention

The present invention relates to food cutters and food servers which are highly stable during both cutting and serving operations.

2. Description of the Related Art

Conventionally, a slice of food such as a slice of cake is defined by at least two cuts made by a knife on opposite sides thereof. A spatula, cake server or other similar instrument is then placed under the slice to remove and serve the slice. This, however, results in a relatively complicated operation for serving each slice. In addition, the slices are not always served as whole pieces. That is, they often fall apart after cutting but prior to placement on a plate.

Cake cutting and serving devices which are able to concurrently cut both sides of a slice and then engage the cut slice for removal are known from, for example, U.S. Pat. No. 2,264,486 (Smith et al), U.S. Pat. No. 2,600,646 (Haugland), U.S. Pat. No. 2,770,035 (O'Brien), U.S. Pat. No. 2,841,868 (O'Brien) and U.S. Pat. No. 4,637,138 (Piche), and U.S. Des. Pat. No. 248,271 (McGee, III).

U.S. Pat. No. 2,264,486 (Smith et al) discloses handles that are offset at an angle from the cutting blades. Therefore, the cutting blades can only cut a large triangular sector whose dimensions can not be altered. This is very limiting, particularly in view of the many different sizes and shapes of cakes to be cut.

U.S. Pat. No. 2,600,646 to Haugland discloses curved handles that do not extend in the same plane as the blades. In such arrangement, to form a substantially triangular piece of cake, which is the conventional shape of a piece of cake, the handles are not in contact with each other, thereby making secure gripping of the device more difficult. Although the handles can be pressed further toward each other so that the handles are in contact with each other, there is contact of the handles only at the front ends thereof, and also, such secure contact of the handles occurs only when cutting a thin rectangular piece, not a triangular piece.

The remaining above-identified patents provide more complicated and/or less versatile cake cutters and servers.

Other related cake cutters are disclosed in U.S. Patent No. 1,104,718 (Trevisan), U.S. Pat. No. 2,403,190 (Parraga), U.S. Pat. No. 3,045,347 (Elias et al) and U.S. Pat. No. 5,129,159 (Fuenzalida). While, these cake cutters cut cake, they do not remove and serve the slices.

OBJECTS AND SUMMARY OF THE INVENTION

Accordingly, it is an object of the present invention to provide a combination cutter and server which overcomes the aforementioned problems.

It is another object of the present invention to provide a combination cutter and server that can cut, for example a cake, into a plurality of slices and remove each slice for serving immediately after the slice has been cut.

It is still another object of the present invention to provide a combination cutter and server in which the shape of the slice that is cut can be altered by compressing the cutter and server handles toward each other in varying amounts.

It is yet another object of the present invention to provide a combination cutter and server in which the handles of the device are in contact with each other in a stable condition in at least two different conditions for cutting and serving two different shaped slices of food.

It is a further object of the present invention to provide a combination cutter and server that is easy and economical to use and manufacture.

According to the present invention, a combination cutter and server, includes a first thin flexible blade having front and rear opposite ends; a second thin flexible blade having front and rear opposite ends; a connecting section which couples the front end of the first thin blade and the front end of the second thin blade; a first handle connected to the rear end of the first thin blade; and a second handle connected to the rear end of the second thin blade and being unconnected with the first handle. The first handle is coplanar with the first thin blade in an unbiased condition of the combination cutter and server, and the second handle is coplanar with the second thin blade in an unbiased condition of the combination cutter and server. Only rear ends of the first and second handles are in contact with one another to form the combination cutter and server into a first geometric cutting configuration when the first and second handles are initially moved toward each other to an initial biased position. Further, the first and second handles are in contact with other along substantially entire lengths thereof to form the combination cutter and server into a second geometric cutting configuration, which is different from the first geometric cutting configuration, when the first and second handles are further moved toward each other from the initial biased position.

In one embodiment, the blades are formed by a thin, flat and flexible sheet of metal which is bent at a center section thereof so as to form the two blades which diverge away from each other at a slightly rounded nose section. Upper edges of the blades, beginning from the nose section to an approximate mid-point of each blade, are cut away to form an upwardly curved upper edge portion. Each blade has a generally rectangular shape, and a straight, non-serrated bottom edge. Preferably, the diverging angle is approximately 20 degrees. Preferably, the first geometric cutting configuration is a substantially triangular shape and the second geometric cutting configuration is a substantially rectangular shape.

In a second embodiment, the blades are formed by a thin, flat and flexible sheet of metal which is bent into a U-shape having the first and second blades substantially parallel and spaced apart from each other in an unbiased condition of the combination cutter and server, and a center connecting blade which connects opposite ends of the first and second blades together and is oriented substantially perpendicular to the first and second blades. Again, each blade has a generally rectangular shape. Upper edges of the first and second blades, beginning at an attachment to the center connecting blade, to a point of each first and second blade which is approximately one-third of the length thereof, are cut away to form an upwardly curved upper edge portion. Preferably, the first geometric cutting configuration is a substantially trapezoidal shape and the second geometric cutting configuration is a substantially reverse triangular shape.

The above and other objects, features and advantages of the present invention will become readily apparent from the following detailed description thereof which is to be read in connection with the accompanying drawings.

DETAILED DESCRIPTION OF THE PREFERRED EMBODIMENTS

Referring to the drawings in detail, and initially to FIGS. 1–8, a combination cutter and server 10 according to a first embodiment of the present invention includes a thin, flat and flexible sheet of metal 12 which is bent at a center section thereof so as to form two blades 14 and 16 which diverge away from each other at a slightly rounded nose section 18 in an unbiased condition of the combination cake cutter and server 10. The diverging angle is shown in the drawings as being approximately 20 degrees, although the present invention is not limited thereby. Each blade 14 and 16 has a generally rectangular shape with straight, non-serrated bottom edges 20. For example, the blades 14 and 16 can each have a length of about 13.5 cm and a height of about 4.5 cm. The upper edges of blades 14 and 16, beginning from nose section 18 to approximately the mid-point of each blade 14 and 16, are cut away by the same amount, to form an upwardly curved upper edge portion 22.

Thin, flat sheet of metal 12 also includes rear extension portions 24 that extend rearwardly as continuations of upper portions of blades 14 and 16. Handles 26 are secured to rear extension portions 24. Handles 26 extend linearly, that is, not in a curved manner, and are connected with rear extension portions 24 so as to extend in the same planes as blades 14 and 16. For example, handles 26 can include slots 28 for receiving rear extension portions 24 therein, with transverse rivets 30 being provided through handles 26 and rear extension portions 24 to secure handles 26 to rear extension portions 24.

Figure 1:
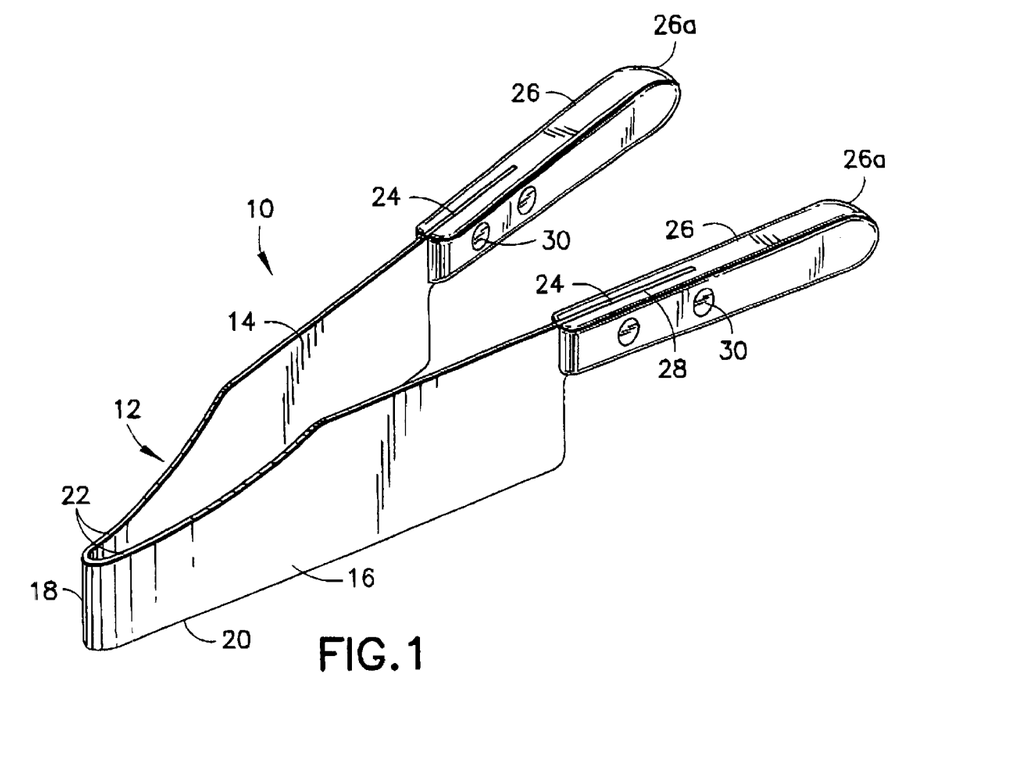
FIG. 1 is a top, front, right side perspective view of a combination cake cutter and server according to a first embodiment of the present invention.
Figure 2:
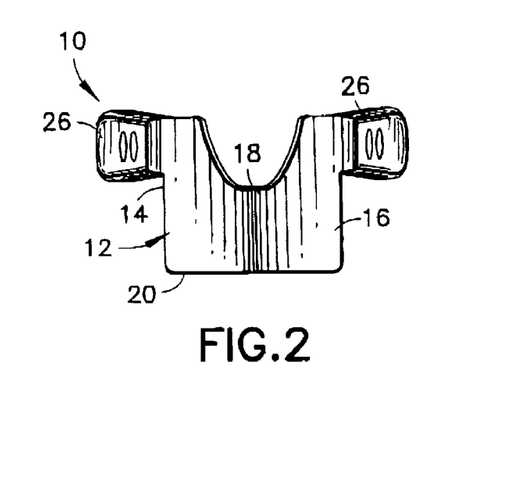
FIG. 2 is a front elevational view thereof.
Figure 3:
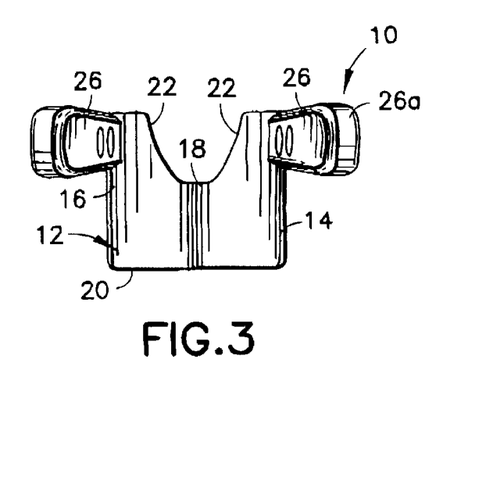
FIG. 3 is a rear elevational view thereof.
Figure 4:
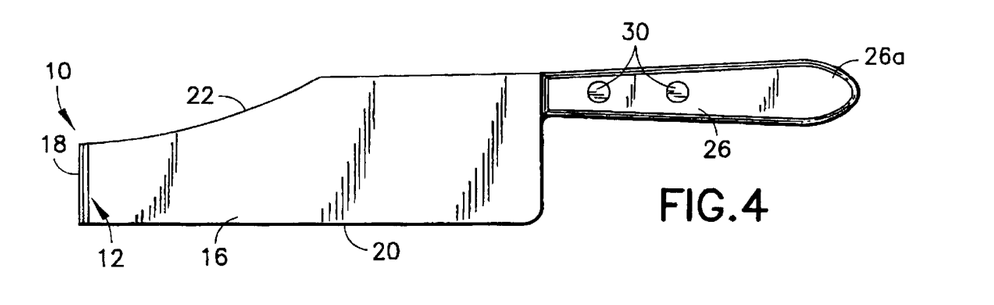
FIG. 4 is a right side elevational view thereof, the left side elevational view being a mirror image.
Figure 5:
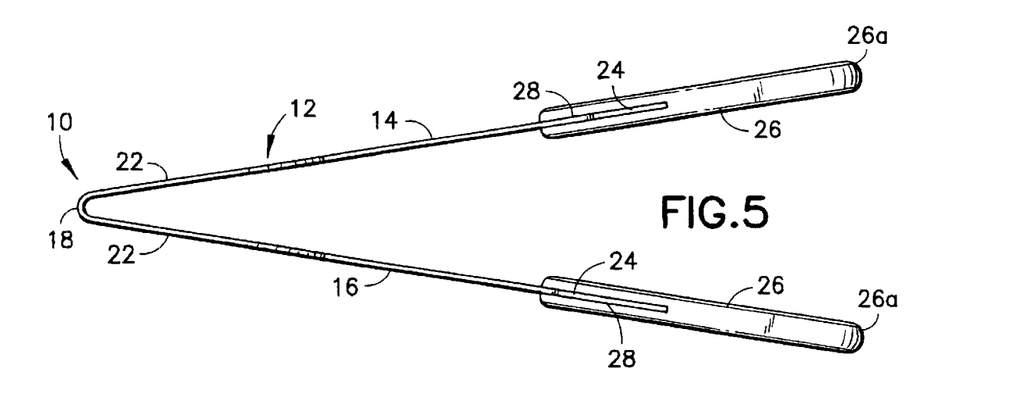
FIG. 5 is a top plan view thereof.
Figure 6:
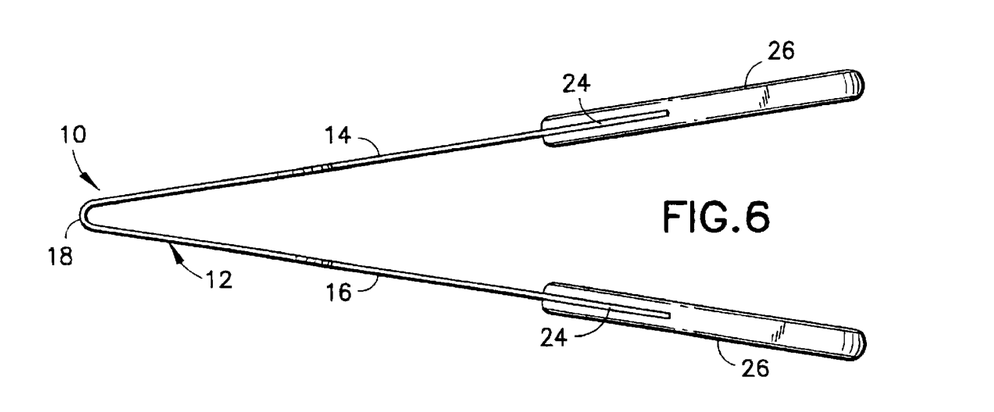
FIG. 6 is a bottom plan view thereof.
Figure 7:
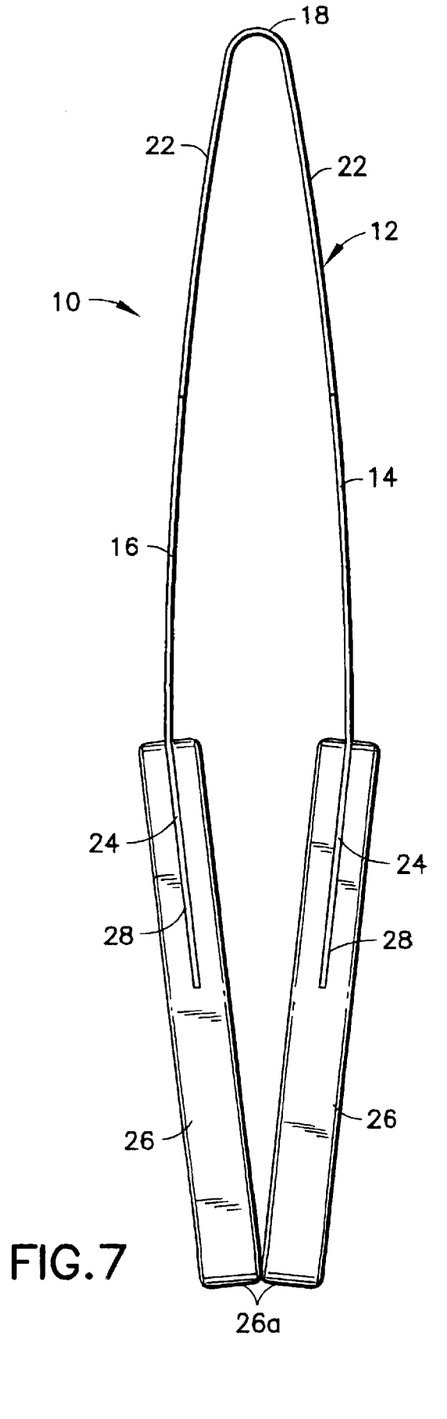
FIG. 7 is a top plan view thereof in a partially compressed condition.

Handles 26 extend in the same plane as blades 14 and 16. As a result, when handles 26 are compressed by a user, the rear ends 26a of handles 26 first come into contact with each other. In such arrangement, as shown in FIG. 7, blades 14 and 16 bend in a slightly arcuate configuration, thereby still cutting a substantially triangular piece of cake, while at the same time, providing a secure gripping arrangement that does not change shape. In contrast in the prior art, in order to form a substantially triangular piece of cake, which is the conventional shape of a piece of cake that is cut, the handles are not in contact with each other, thereby making secure gripping of the device more difficult.

Figure 8:
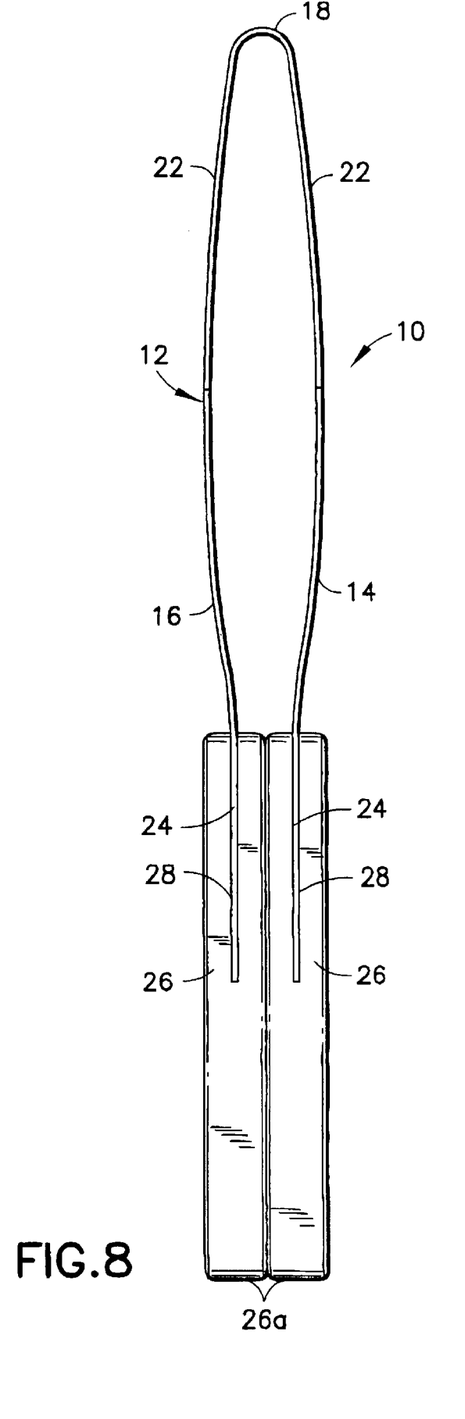
FIG. 8 is a top plan view thereof in a fully compressed condition.
Figure 9:
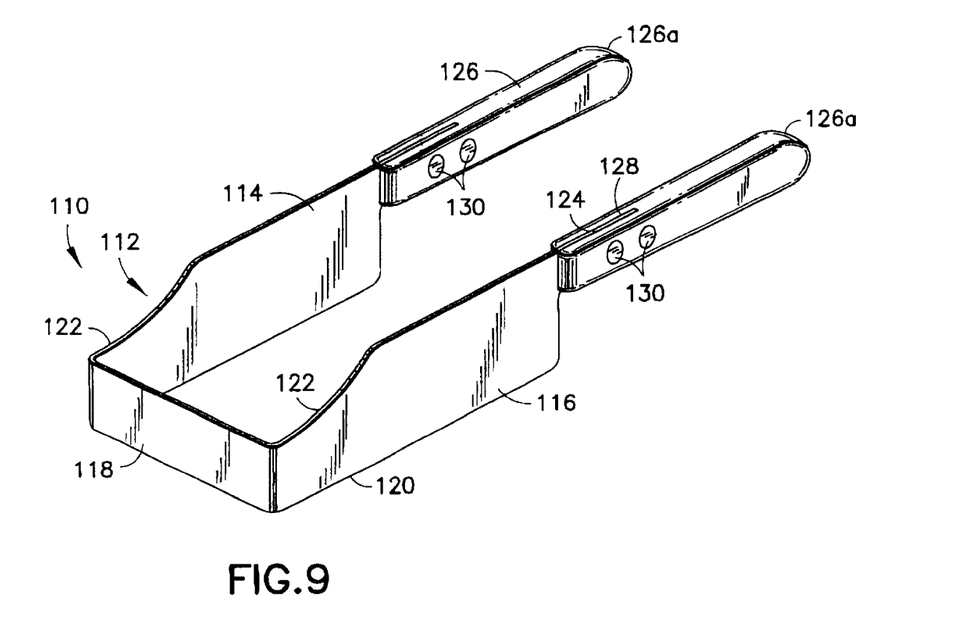
FIG. 9 is a top, front, right side perspective view of a combination cake cutter and server according to a second embodiment of the present invention.
Figure 10:
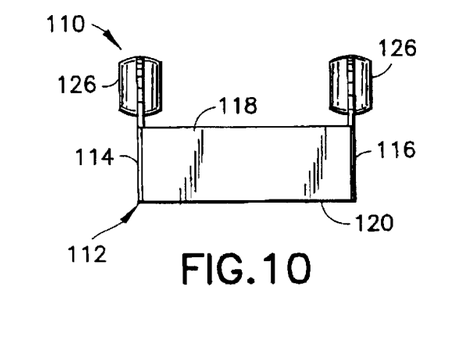
FIG. 10 is a front elevational view of the second embodiment.
Figure 11:
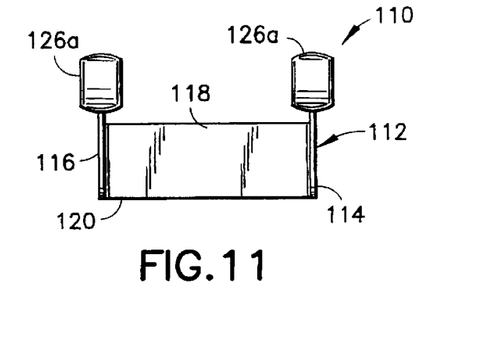
FIG. 11 is a rear elevational view of the second embodiment.
Figure 12:
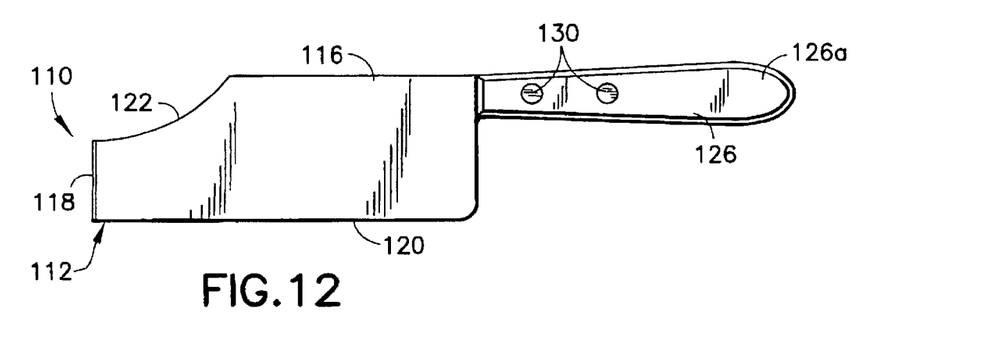
FIG. 12 is a right side elevational view of the second embodiment, the left side elevational view being a mirror image.
Figure 13:
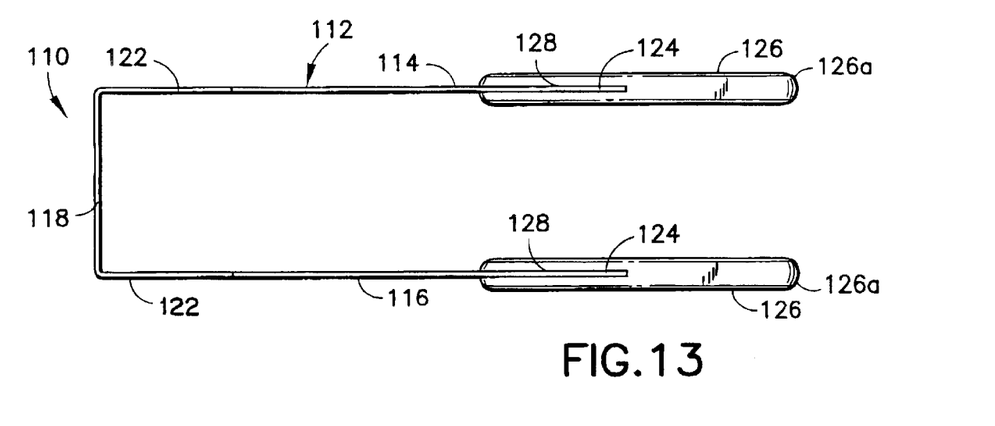
FIG. 13 is a top plan view of the second embodiment.
Figure 14:
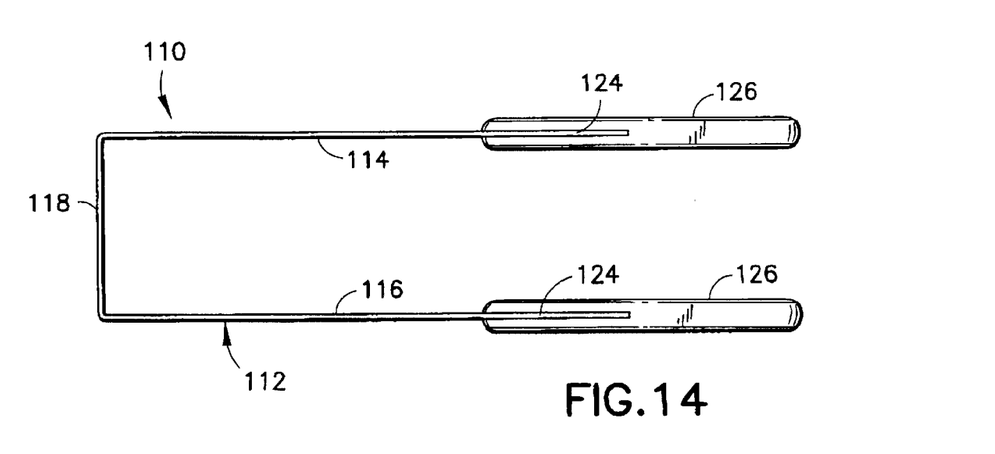
FIG. 14 is a bottom plan view of the second embodiment.

Further, handles 26 can be pressed further toward each other so that the handles are in contact with each other, along substantially the entire length thereof, as shown in FIG. 8. In this position, blades 14 and 16 are substantially parallel with each other. Unlike the prior art, however, where there is contact of the handles only at the front ends thereof, the handles 26 of the present invention are in contact substantially along the entire length thereof, providing a very secure arrangement.

Thus, the present invention provides for two different cutting shapes, namely substantially triangular (FIG. 7) and thin rectangular (FIG. 8), and in which handles 26 are in contact with each in both positions, providing an easy and secure holding arrangement.

The present invention also includes non-serrated bottom edges 20 to blades 14 and 16. It has been found that the serrated bottom edges of the prior art are not necessary, in view of the very thin nature of the blades 14 and 16.

In operation, the user compresses handles 26 to the substantially triangular configuration of FIG. 7 or the substantially thin rectangular configuration of FIG. 8, such that handles 26 are in contact with each other. For example, in the configuration of FIG. 7, the user can grasp the rear ends 26a of handles 26 to maintain this relation, while in FIG. 8, the user can grasp the middle or forward portions of handles 26, and squeeze them together. Then, the user pushes blades 14 and 16 through the cake. Combination cake cutter and server 10 can then be pulled radially outward of the cake to remove the slice of cake. Alternatively, in the arrangement of FIG. 7, handles 26 can be compressed slightly more toward each other to compress slightly against the sides of the slice of cake for easier removal of the same.

Of course, it will be appreciated that the present invention is not limited by the above operation. For example, if larger angled triangular sectors are to be cut from the cake, blades 14 and 16 of combination cake cutter and server 10 can be pushed through the cake in a condition where handles 26 are not in contact with each other. In such case, handles 26 can be compressed slightly more toward each other to compress slightly against the sides of the slice of cake for easier removal of the same.

Referring now to FIGS. 9–16, there is shown a combination cake cutter and server 110 according to another embodiment of the present invention, in which elements corresponding to those of combination cake cutter and server 10 are identified by the same reference numerals augmented by 100, and accordingly, a detailed description of the common elements will not be made herein for the sake of brevity.

Specifically, combination cake cutter and server 110 includes a thin, flat and flexible sheet of metal 112 which is bent into a U-shape having two substantially parallel, spaced apart blades 114 and 116 and a center connecting blade 118 which connects opposite ends of blades 114 and 116 together and is oriented substantially perpendicular to blades 114 and 116, in an unbiased condition of combination cake cutter and server 110. Each blade 114, 116 and 118 has a generally rectangular shape with a straight, non-serrated bottom edge 120. As an example, blades 114 and 116 can each have a length of about 10.5 cm and a height of about 4.5 cm, while blade 118 can have a length of about 6 cm and a height of about 2.5 cm. The upper edges of blades 114 and 116, beginning with the attachment to center connecting blade 118, to a point of each blade 114 and 116 which is approximately one-third of the length thereof, are cut away by the same amount, to form an upwardly curved upper edge portion 122.

Thin, flat sheet of metal 112 also includes rear extension portions 124 that extend rearwardly as continuations of upper portions of blades 114 and 116. Handles 126 are secured to rear extension portions 124. Handles 126 extend linearly, that is, not in a curved manner, and are connected with rear extension portions 124 so as to extend in the same planes as blades 114 and 116. For example, handles 126 can include slots 128 for receiving rear extension portions 124 therein, with transverse rivets 130 being provided through handles 126 and rear extension portions 124 to secure handles 126 to rear extension portions 124.

As with the first embodiment, handles 126 extend in the same plane as blades 114 and 116. As a result, when handles 126 are compressed, the rear ends 126a of handles 126 first come into contact with each other. In such arrangement, as shown in FIG. 15, blades 114 and 116 bend or flex inwardly from center connecting blade 118, but maintain their planar configuration, in order to cut a substantially trapezoidal piece of cake, while at the same time, providing a secure gripping arrangement that does not change shape.

Figures 15, 16:
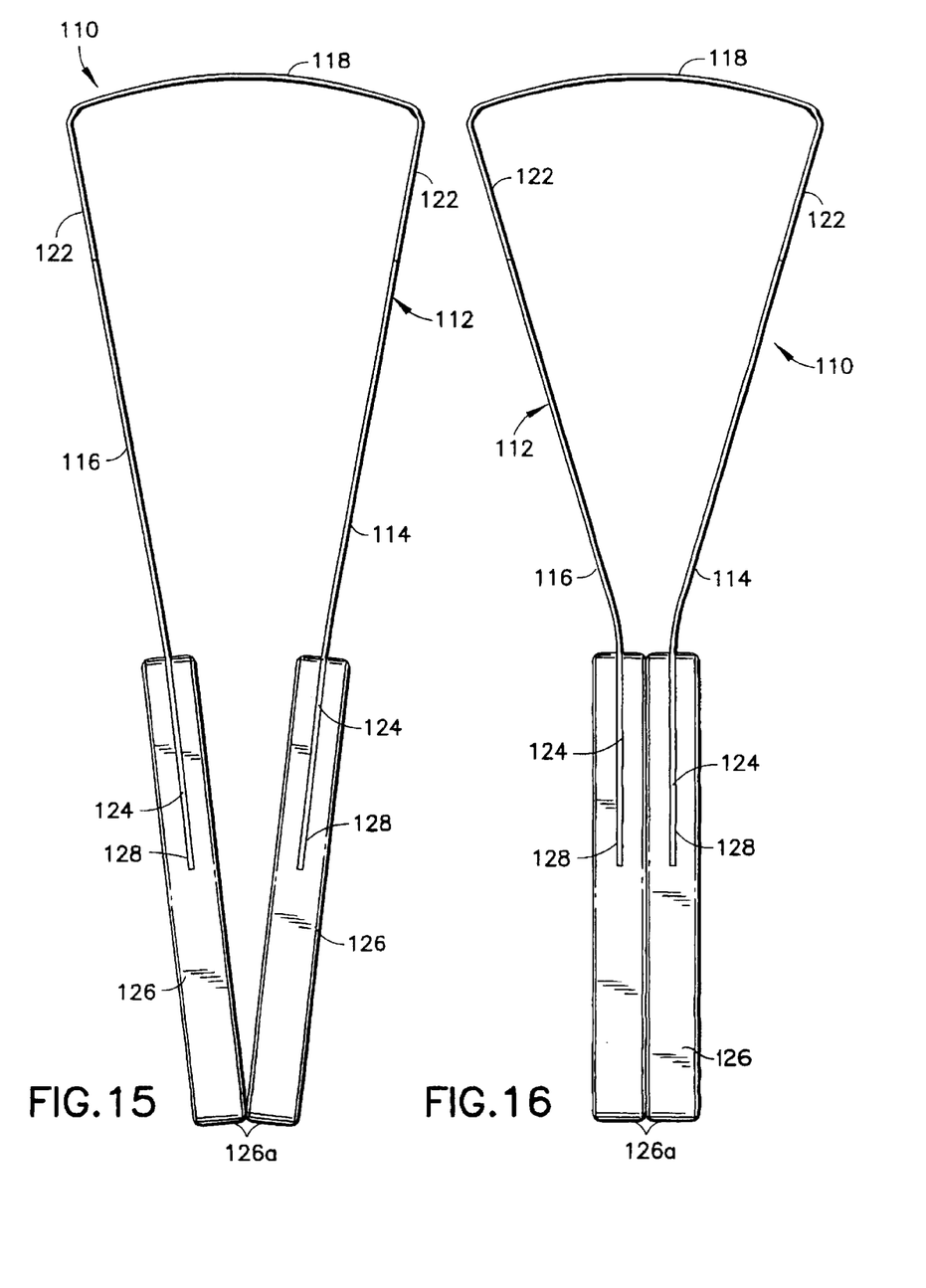
FIG. 15 is a top plan view thereof in a partially compressed condition.
FIG. 16 is a top plan view thereof in a fully compressed condition.

Further, handles 126 can be pressed further toward each other so that the handles are in contact with each other, along substantially the entire length thereof, as shown in FIG. 16. In this position, blades 114 and 116 are substantially parallel with each other. Thus, handles 126 of the present invention are in contact substantially along the entire length thereof, providing a very secure arrangement. In this arrangement, a substantially reverse triangular piece of cake is cut.

Thus, the present invention provides for two different cutting shapes, namely substantially trapezoidal (FIG. 15) and substantially reverse triangular (FIG. 16), and in which handles 126 are in contact with each in either position, providing an easy and secure holding arrangement.

In operation, the user compresses handles 126 to the substantially trapezoidal configuration of FIG. 15 or the substantially reverse triangular configuration of FIG. 16, such that handles 126 are in contact with each other. For example, in the configuration of FIG. 15, the user can grasp the rear ends 126a of handles 126 to maintain this relation, while in FIG. 16, the user can grasp the middle or forward portions of handles 126, and squeeze them together. Then, the user pushes blades 114, 116 and 118 through the cake. Combination cake cutter and server 110 can then be pulled radially outward of the cake to remove the slice of cake. Alternatively, in the arrangement of FIG. 15, handles 126 can be compressed slightly more toward each other to compress slightly against the sides of the slice of cake for easier removal of the same.

Of course, it will be appreciated that the present invention is not limited by the above description. For example, if larger angled sectors are to be cut from the cake, blades 114 and 116 of combination cake cutter and server 110 can be pushed through the cake in a condition where handles 126 are not in contact with each other. For example, a substantially rectangular piece of cake can be cut in the configuration of FIG. 5. In such case, handles 126 can be compressed slightly more toward each other to compress slightly against the sides of the slice of cake for easier removal of the same.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope or spirit of the invention as defined by the appended claims. For example, the cutter and server of the present invention need not be used only for cutting and serving cake, but could also be utilized for cutting and serving any suitable food.

What is claimed is:

1. A combination cutter and server, comprising:

a first thin flexible blade having front and rear opposite ends;

a second thin flexible blade having front and rear opposite ends;

a connecting section which connects together the front end of the first thin blade and the front end of the second thin blade;

a first handle connected to the rear end of the first thin blade;

a second handle connected to the rear end of the second thin blade and being unconnected with said first handle;

the first handle being coplanar with the first thin blade in an unbiased condition of the combination cutter and server and the second handle being coplanar with the second thin blade in an unbiased condition of the combination cutter and server;

only rear ends of the first and second handles being in contact with other to form said combination cutter and server into a first geometric cutting configuration when said first and second handles are initially moved toward each other to an initial biased position; and said first and second handles being in contact with each other along substantially entire lengths thereof to form said combination cutter and server into a second, different geometric cutting configuration when said first and second handles are further moved toward each other from said initial biased position.

2. A combination cutter and server according to claim 1, wherein said blades are formed by a thin, flat and flexible sheet of metal which is bent at a center section thereof so as to form said two blades which diverge away from each other at a slightly rounded nose section.

3. A combination cutter and server according to claim 2, wherein upper edges of the blades, beginning from the nose section to an approximately mid-point of each blade, are cut away to form an upwardly curved upper edge portion.

4. A combination cutter and server according to claim 2, wherein each blade has a generally rectangular shape.

5. A combination cutter and server according to claim 2, wherein the diverging angle is approximately 20 degrees.

6. A combination cutter and server according to claim 2, wherein the first geometric cutting configuration is a substantially triangular shape and the second geometric cutting configuration is a substantially rectangular shape.

7. A combination cutter and server according to claim 1, wherein each blade has a substantially straight, non-serrated bottom edge.

8. A combination cutter and server according to claim 1, wherein said blades are formed by a thin, flat and flexible sheet of metal which is bent into a U-shape having said first and second blades substantially parallel and spaced apart from each other in an unbiased condition of said combination cutter and server, and a center connecting blade which connects opposite ends of said first and second blades together and is oriented substantially perpendicular to said first and second blades.

9. A combination cutter and server according to claim 8, wherein each blade has a generally rectangular shape.

10. A combination cutter and server according to claim 8, wherein upper edges of the first and second blades, beginning at an attachment to the center connecting blade, to a point of each first and second blade which is approximately one-third of the length thereof, are cut away to form an upwardly curved upper edge portion.

11. A combination cutter and server according to claim 8, wherein the first geometric cutting configuration is a substantially trapezoidal shape and the second geometric cutting configuration is a substantially reverse triangular shape.

* * * * *